(12) United States Patent
Gropp et al.

(10) Patent No.: US 12,139,059 B2
(45) Date of Patent: Nov. 12, 2024

(54) MORPHING BENCH SEAT

(71) Applicant: Brose Fahrzeugteile SE & Co. Kommanditgesellschaft, Coburg, Coburg (DE)

(72) Inventors: Jörg Gropp, Böhlen (DE); Gregor Kröner, Bischberg (DE); Jacqueline Albrecht, Kolitzheim (DE); Tuba Yildirim, Coburg (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 181 days.

(21) Appl. No.: 17/640,376

(22) PCT Filed: Aug. 31, 2020

(86) PCT No.: PCT/EP2020/074189
§ 371 (c)(1),
(2) Date: Apr. 21, 2022

(87) PCT Pub. No.: WO2021/043705
PCT Pub. Date: Mar. 11, 2021

(65) Prior Publication Data
US 2022/0332233 A1    Oct. 20, 2022

(30) Foreign Application Priority Data

Sep. 4, 2019 (DE) ..................... 10 2019 123 681.9

(51) Int. Cl.
*B60N 2/22* (2006.01)
*B60N 2/30* (2006.01)
(Continued)

(52) U.S. Cl.
CPC ................. *B60N 2/68* (2013.01); *B60N 2/22* (2013.01); *B60N 2/3011* (2013.01); *B60N 2/643* (2013.01);
(Continued)

(58) Field of Classification Search
CPC ........ B60N 2/865; B60N 2/0268; B60N 2/20; B60N 2/646; B60N 2/643; B64D 11/064
See application file for complete search history.

(56) References Cited

U.S. PATENT DOCUMENTS 4,902,069 A * 2/1990 Lehnert ............. B64D 11/0691
297/14
5,564,780 A * 10/1996 Presser ................ B60N 2/3047
297/238

(Continued)

FOREIGN PATENT DOCUMENTS

CA    3058153 A1 * 4/2020    ........... A47C 1/0342
CN    1962318 A    5/2007
(Continued)

OTHER PUBLICATIONS

Chinese Office Action for Application No. 202080056776.9, Dated Mar. 22, 2023, English Translation attached to original, All together 23 Pages.

*Primary Examiner* — Timothy J Brindley
(74) *Attorney, Agent, or Firm* — Dickinson Wright PLLC (57) ABSTRACT

A vehicle seat including at least one outer frame on which an outer part of a seating surface is supported, and at least one inner frame on which an inner part of the seating surface is supported and which is movable relative to the outer frame.

22 Claims, 9 Drawing Sheets

(51) Int. Cl.
*B60N 2/64* (2006.01)
*B60N 2/68* (2006.01)
*B60N 2/90* (2018.01)

(52) U.S. Cl.
CPC ............. *B60N 2/646* (2013.01); *B60N 2/995* (2018.02); *B60N 2205/30* (2013.01)

(56) References Cited

U.S. PATENT DOCUMENTS

| | | | |
|---|---|---|---|
| 6,896,322 B1 * | 5/2005 | Foy .......................... | A47C 9/06 297/14 |
| 9,796,307 B2 * | 10/2017 | Awatani ............... | B60N 2/6673 |
| 10,525,851 B2 * | 1/2020 | Huang ..................... | B60N 2/68 |
| 11,370,335 B1 * | 6/2022 | Cabrera ............... | B60N 2/2806 |
| 2002/0060485 A1 * | 5/2002 | Fischer ................. | B60N 2/646 297/284.4 |
| 2003/0025371 A1 * | 2/2003 | Veneruso .......... | B64D 11/06395 297/322 |
| 2007/0107969 A1 | 5/2007 | Ootani et al. | |
| 2009/0218859 A1 | 9/2009 | Lawall et al. | |
| 2011/0285189 A1 * | 11/2011 | Petzel .................... | B60N 2/667 297/284.1 |
| 2014/0225407 A1 | 8/2014 | Nagayasu | |
| 2015/0084390 A1 | 3/2015 | Tanaka et al. | |
| 2015/0321580 A1 | 11/2015 | Burns | |
| 2017/0232873 A1 * | 8/2017 | Hall ...................... | B60N 2/809 297/180.12 |
| 2018/0155033 A1 * | 6/2018 | Pacheco ................. | B60N 2/995 |
| 2018/0272969 A1 | 9/2018 | Onuma | |
| 2020/0262561 A1 * | 8/2020 | Verny ................ | B64D 11/0641 |
| 2021/0401178 A1 * | 12/2021 | Lai .......................... | A47C 1/032 |
| 2023/0242258 A1 * | 8/2023 | Finlay .................. | B64D 11/064 297/367 R |
| 2023/0249831 A1 * | 8/2023 | Kodati ............... | B64D 11/0696 297/330 |

FOREIGN PATENT DOCUMENTS

| | | | | |
|---|---|---|---|---|
| CN | 104512288 | A | | 4/2015 |
| CN | 104936820 | A | | 9/2015 |
| CN | 207617581 | U | | 7/2018 |
| DE | 10139763 | A1 | | 3/2003 |
| DE | 102004027009 | A1 | | 12/2005 |
| DE | 102009041655 | A1 | | 3/2011 |
| DE | 102014107611 | A1 | | 1/2015 |
| DE | 102014209189 | A1 | | 11/2015 |
| DE | 102015210526 | A1 * | 12/2016 | |
| DE | 102020106027 | A1 * | 9/2021 | ........... B64D 11/064 |
| FR | 2961760 | A | | 12/2011 |
| JP | 2007301222 | A | | 11/2007 |
| JP | 2018114851 | A * | 7/2018 | ............. B60N 2/161 |
| WO | 9622715 | A1 | | 8/1996 |

* cited by examiner

MORPHING BENCH SEAT

CROSS-REFERENCE TO RELATED APPLICATIONS

This application is the U.S. National Phase of PCT Application No. PCT/EP2020/074189 filed on Aug. 31, 2020, which claims priority to German Patent Application No. DE 10 2019 123 681.9, filed on Sep. 4, 2019, the disclosures of which are hereby incorporated in their entirety by reference herein.

TECHNICAL FIELD

This present disclosure relates to a vehicle seat and a method of setting the same.

BACKGROUND

In vehicle seats, in particular rear bench seats, as they are currently installed in many vehicles, three seating places for one passenger each often are provided in one row. For an increased seating comfort, the two outer seating places regularly are provided with a trough-shaped contour for forming a seat pan. For the middle seat, there is usually not enough space for such contouring. In the middle of the seat this generally results in a formation elevated with respect to the seat pans, which can also be referred to as seat bump. When all three seating places are occupied, the two outer passengers sit in the seat pans, the middle passenger on the elevated seat bump. In many vehicles, the width of the middle seating place also is of narrower dimension than the widths of the outer seating places. For example, divisions in percent of the full width of the bench seat corresponding to 40-20-40 are common practice. The middle passenger then sits on the narrow seat bump, which can be uncomfortable in particular on longer journeys. In addition, when three grown-up passengers are sitting on the three seating places, the two outer passengers often must slightly move to the outside to provide enough room for the third passenger in the middle. As a result, the outer passengers often are not seated centrally in the seat pans and corresponding backrest pans, but offset towards the outside, which can lead to a slouched and uncomfortable sitting posture.

SUMMARY

One or more objects of the present disclosure may be to provide improved comfort of a vehicle seat.

Accordingly, a vehicle seat is provided. The vehicle seat may include at least one outer frame that is configured to support an outer part of a seating surface, and at least one inner frame that is configured to support an inner part of the seating surface and is movable relative to the outer frame.

It thereby is achieved in each case that depending on a current demand, the geometry of the structure supporting the seating surface can be varied by a corresponding movement of the inner frame relative to the outer frame. For different utilization scenarios, a particularly well fitting setting can always be chosen. The vehicle seat can therefore be referred to as a morphing vehicle seat. The vehicle seat for example may be a bench seat, i.e. a morphing bench seat.

The inner part of the seating surface is surrounded by the outer part of the seating surface e.g. on two or three sides. The inner part of the seating surface can extend over a large part of the length and/or the width of the seating surface.

It can be provided that a contour of the seating surface or backrest surface can be varied by a movement of the inner frame relative to the outer frame. Depending on the current number of seat users, the best fitting contour can be chosen. For example, a surface of the vehicle seat is variable between a flat and a contoured design.

According to another embodiment, the vehicle seat may include at least one outer frame, which is configured to support an outer part of the seating surface or backrest surface, and at least one inner frame, which is configured to support an inner part of the seating surface or backrest surface and is movable relative to the outer frame. It is provided that the inner frame can be moved into a first position relative to the outer frame, in which the outer part and the inner part of the seating surface or backrest surface are non-contoured, in particular arranged flat, and can be moved into a second position relative to the outer frame, in which the outer and the inner part of the seating surface or backrest surface are arranged in the form of a trough. A headrest surface of a headrest here is understood to be part of the backrest surface. In one embodiment, said outer and inner parts of the backrest surface, however, are arranged below the headrest and/or a headrest region.

If e.g. flat transport material is to be loaded, the flat configuration can be chosen. If the vehicle seat is configured in the form of a bench seat and several seat users want to sit down on the bench seat, the inner frame can be brought into the first position. On the seating surface which then is flat (without seating trough(s)), the seat users can take their seats on equal terms, without being brought into an uncomfortable seating posture due to an asymmetrically occupied seat pan and/or backrest pan.

For example, in the second position the seating surface or backrest surface is formed trough-shaped relative to the outer frame. For example, the seating surface forms a seat pan. This provides for a particularly comfortable seating posture, if the utilization situation permits a symmetric seating posture.

The inner frame and/or the outer frame each can include two side parts. It can be provided that in the first position of the inner frame all four side parts are aligned parallel to each other (in particular are arranged in one plane). The side parts of the inner frame and/or of the outer frame are firmly connected to each other e.g. via one or two cross-beams each.

Optionally, the inner frame is pivotable relative to the outer frame about a pivot axis. This provides for a particularly simple and robust mechanism. The pivot axis extends e.g. parallel to the one or to the two cross-beams of the outer frame and/or of the inner frame. Alternatively, e.g. a slotted link guide is possible.

Optionally, the inner frame carries an inner supporting element forming the inner part of the seating surface or backrest surface associated with the seating place, and the outer frame carries an outer supporting element forming the outer part of the seating surface or backrest surface associated with the seating place, One or both of the supporting elements are manufactured e.g. from a flat material. Alternatively, in particular in the case of relatively small surfaces, e.g. a headrest of the backrest, the inner frame and/or the outer frame itself can form the inner and/or outer part of the seating surface or backrest surface.

Optionally, the inner supporting element is configured in the form of an elastic spring mat and/or manufactured from organic sheet. For example, spring tongues are cut free from a piece of flat material in order to form the spring mat. The outer supporting element can be manufactured from the same material as the inner supporting element.

The inner frame and the outer frame can be parts of a seat part and support the seating surface. Furthermore, the vehicle seat can comprise a backrest, with an outer frame that is configured to support an outer part of a backrest surface associated with the seating place, and an inner frame that is configured to support an inner part of the backrest surface associated with the seating place and is movable relative to the outer frame. In this way, the seating surface and the backrest surface of the seating place can be adjusted individually or jointly in order to alternate between a flat and a contoured configuration. The contour can specify one or more seating places, while the flat configuration provides for seat users to change their seating position without sacrificing comfort.

An adjustment of the inner frame of the seat part relative to the outer frame of the seat part can be coupled to an adjustment of the inner frame of the backrest relative to the outer frame of the backrest. This allows easy setting of a comfortable configuration and a simple construction.

Alternatively or additionally, a movement of the inner frame relative to the outer frame can be coupled to a movement of the backrest relative to the seat part. This allows a simultaneous adjustment of the contour of the seating surface and/or the backrest surface with an adjustment of the backrest inclination using a particularly simple drive mechanism, e.g. only one motor.

Optionally, the vehicle seat is configured as a bench seat with a plurality of seating places. For example, the bench seat may include a first seating place and a second seating place, each having at least one outer frame and one inner frame adjustable relative thereto. This provides for an even greater variability when setting the bench seat. The inner frame of the plurality of seating places can be synchronously adjustable, e.g. by forced coupling or by a correspondingly preconfigured control device.

Furthermore, the bench seat can comprise a third seating place, which is arranged between the first and the second seating place and optionally does not comprise an inner frame adjustable relative to an outer frame, alternatively may include an inner frame adjustable relative to an outer frame. Thus, the vehicle seat can be either a contourable individual seat or a bench seat having two seating places (e.g. the broader part of a bench seat divided 60/40), of which one or both are contourable, or a bench seat having more than two, e.g. three seating places, of which one, several (e.g. two of three) or all are contourable.

Furthermore, the vehicle seat can comprise at least one electric drive that is adapted to effect an adjustment of the inner frame relative to the outer frame. This provides for an automatic setting of an optimum seat contour.

The electric drive can be activatable in dependence on the actuation of an input means, a door contact, a seat occupation sensor and/or a communication interface. For this purpose, the electric drive or a control unit controlling the electric drive can be coupled with the input means, the door contact, the seat occupation sensor and/or the communication interface, e.g. be communicatively connected therewith.

Optionally, there is provided a control unit that is adapted to effect an adjustment of the inner frame relative to the outer frame in dependence on an entry and/or an exit of a seat user. Optionally, the control unit detects the entry and/or exit, and/or it detects a number of seat users of the vehicle seat configured as a bench seat and, in dependence on this, sets the at least one inner frame relative to the outer frame. The control unit can be arranged on the vehicle seat. Alternatively, the control unit is arranged at a distance to the vehicle seat and forms an assembly with the same. Optionally, the control unit is configured to provide further vehicle functions. For example, the control unit is a central vehicle controller or, alternatively, the control unit is communicatively connected with a central vehicle controller.

In one embodiment, the vehicle seat may include a leg rest which is mounted e.g. on the inner frame. The provides for a further increased comfort. Due to being mounted on the inner frame, the leg rest also is likewise movable relative to the outer frame, e.g. together with the inner frame. Hence, the leg rest remains in the same orientation relative to the inner part of the seating surface and is entrained e.g. into a relax or reclined position.

In one development it is provided that the leg rest is pivotally connected to the inner frame and is pivotable relative to the inner frame by means of an electric drive. If necessary, e.g. the inclination of the leg rest relative to the inner part of the seating surface can be set. A movement of the inner frame relative to the outer frame does not change this setting.

Optionally, the outer frame and the inner frame movable relative thereto and in particular arranged within the outer frame are arranged on (in particular in) a headrest of a backrest of the vehicle seat. A headrest surface, which forms part of the backrest surface, thereby can selectively be configured flat or contoured. The head, in particular by using a hair bundle, can be centered in particular in the event of a crash. Optionally, the inner frame of the headrest is contoured like a trough as a result of a detected or expected vehicle crash (e.g. in dependence on at least one sensor signal that detects or predicts a vehicle crash).

In one development, the backrest may include another outer frame below the headrest and an inner frame adjustable relative thereto, which in particular is arranged within the outer frame, in particular for the same seating place. Optionally, both inner frames of the backrest are jointly or independently adjustable relative to the respective outer frames.

According to one aspect, there is provided a method for setting at least one vehicle seat according to an arbitrary embodiment described herein. The method may include the detection of at least one signal, e.g. from an input means, a door contact, a seat occupation sensor and/or a communication interface, and the adjustment of the at least one inner frame relative to the at least one outer frame of the vehicle seat (or each of a plurality of vehicle seats) in dependence on the detected signal, in particular for setting a contour of the seating surface and/or the backrest surface of the vehicle seat.

The signal can indicate a particular utilization scenario so that the vehicle seat can be optimally set for the respective utilization scenario. For example, a flat setting of the seating surface can be chosen for the transport of a flat transport material and a corresponding signal can be entered via the input means.

Optionally, the method furthermore may include the step of determining the number of seat users in dependence on the at least one signal and the setting of the contour of the seating surface and/or the backrest surface in dependence on the determined number of seat users. For example, the vehicle seat configured as a bench seat may include two seating places with inner frames adjustable with respect to outer frames and an interposed middle seat (not adjustable in this way). Optionally, one or more sensors can be used to detect how many and/or at what point seat users are seated on the bench seat and to correspondingly set the bench seat.

Optionally, at least one inner frame is set into the first position relative to the outer frame, in which the inner frame and the outer frame form a flat seating surface or backrest surface when the number of seat users is equal to or greater than a predetermined number, and is set into a second position relative to the outer frame, in which the inner frame and the outer frame form a different, e.g. trough-shaped seating surface or backrest surface when the number of seat users is less than the predetermined number. For example, if only a number of one seat user or two seat users is determined, one or more of the inner frames can be brought into the second position in order to provide one or two comfortable, trough-shaped seating places. If a number of three seat users has been determined, the inner frames can be brought into the first position so that the seat part and/or the backrest is continuously flat. Thus, an equivalent and comfortable seating place can be provided for each of the three seat users. None of the three seat users is urged into an inclined position by the side bolsters on the seat part or on the backrest.

Optionally, two inner frames of a seat part of the vehicle seat configured in particular as a bench seat are adjusted relative to a respectively associated outer frame of the seat part and/or two inner frames of a backrest of the vehicle seat are adjusted relative to a respectively associated outer frame of the backrest.

In one embodiment, an inner frame of the seat part of the vehicle seat is adjusted relative to an outer frame of the seat part and at the same time an inner frame of the backrest of the vehicle seat is adjusted relative to an outer frame of the backrest.

Optionally, there are provided several, in particular two or three vehicle seats arranged one beside the other, each according to any embodiment described herein, and by a corresponding adjustment of the inner frames of each of the vehicle seats relative to the respective outer frames, the contour of the respective seating surface and/or backrest surface of each of the vehicle seats is adjusted.

The idea underlying the invention will be explained in detail below with reference to the exemplary embodiments illustrated in the Figures. In schematic representations.

BRIEF DESCRIPTION OF THE DRAWINGS

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
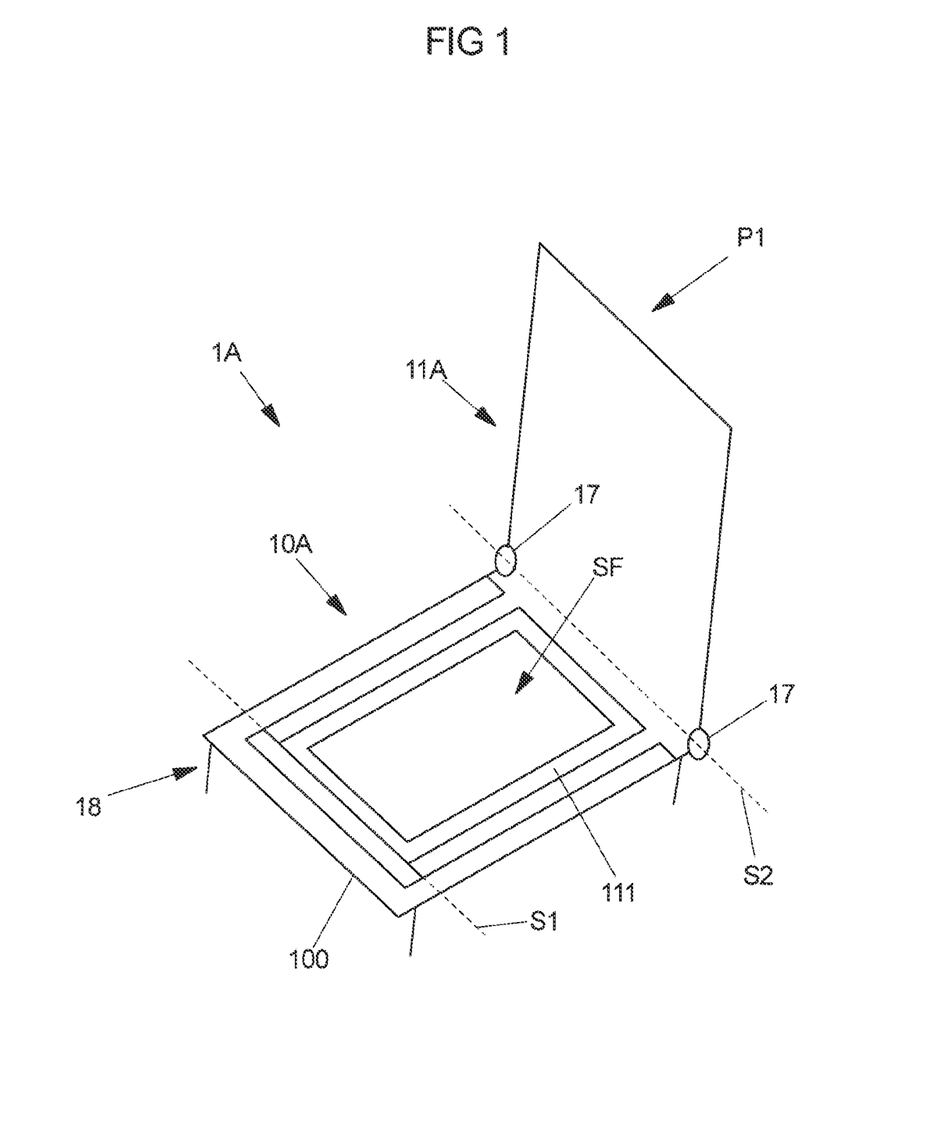
FIG. 1 shows a vehicle seat comprising a backrest and a seat part that includes an outer frame and an inner frame adjustable relative thereto.

FIG. 1 shows a vehicle seat 1A comprising a seat part 10A and a backrest 11A. The backrest 11A is pivotally articulated to the seat part 10A about a pivot axis S2 via adjustment fittings 17. The seat part 10A provides a seating place P1 with a seating surface SF for a seat user. The seat user can sit down on the seating surface SF.

The seat part 10A may include an outer frame 100 and an inner frame 101. The outer frame 100 and the inner frame 101 together support the seating surface SF. In doing so, the outer frame 100 supports an outer part of the seating surface SF, and the inner frame 101 supports an inner part of the seating surface SF. The inner frame 101 is arranged within the outer frame 100. The outer frame 100 surrounds the inner frame 101 on at least two (in particular opposite) sides, in particular on three sides, optionally on four sides.

The inner frame 101 is movable relative to the outer frame 100, in the present case pivotable about a pivot axis S1. For this purpose, the inner frame 101 is mounted on the outer frame 100 via pivot joints, wherein alternatively mounting on a common base 18 is also conceivable. The pivot axis S1 extends in the front region of the seat part 10A, adjacent to the end of the seat part 10A facing away from the pivot axis S2 of the backrest 11A.

The inner frame 101 can be arranged relative to the outer frame 100 such that the seating surface SF is substantially flat. For this purpose, the inner frame 101 and the outer frame 100 can likewise be arranged and arrangeable in one plane. Optionally, the outer frame 100 and/or the inner frame 101 themselves form the seating surface SF. Alternatively, the inner frame 101 and/or the outer frame 100 (each) carries a further component that forms the seating surface SF. Via the seating surface SF, a seat user sitting on the seating place P1 is supported. The seating surface SF is supported partly on the inner frame 101 and partly on the outer frame 100.

The flat position of the inner frame 101 is shown in FIG. 1. This position is suitable e.g. for transporting an object with a flat underside and e.g. when the vehicle seat 1A includes a further seating place closely beside the seating place P1. Proceeding from the flat position, the inner frame 101 is pivotable relative to the outer frame 100, in particular such that the seating surface is formed trough-shaped. For this purpose, the inner frame 101 swivels downwards with its end facing the backrest 11A, so that a depression in the form of a trough deepening towards the backrest 11A is obtained. In this trough, the seat user can sit down and is laterally supported by the trough shape, e.g. during cornering of a vehicle with the vehicle seat.

The outer frame 100 and the inner frame 101 each comprise two (in the present case oblong) side parts, which are firmly connected to each other via at least one (in the present case oblong) cross-beam each. In the flat position of the inner frame 101, all four side parts are arranged parallel to each other and in the illustrated example also all in the same plane. The side parts of the outer frame 100 are stationarily connected or connectable to a vehicle floor, concretely via the base 18. The side parts of the inner frame 101 are movable relative to the side parts of the outer frame 100.

FIGS. 2A to 3B show another vehicle seat 1B comprising a seat part 10B and a backrest 11B, which are connected to a longitudinal adjustment device via a base 18, wherein the longitudinal adjustment device can be mounted on a vehicle floor. The vehicle seat 1B is configured in the form of a bench seat, concretely in the form of a rear bench seat, and provides several, in the present case three seating places P1-P3. The bench seat 1B as a whole can be shifted by means of the longitudinal adjustment device. The seating places P1-P3 of the bench seat 1B are firmly connected to each other. There are provided two outer seating places P1, P2 and a third seating place P3 arranged in between. For each seating place P1-P3 one belt exit point G is provided for one seat belt each.

On each of the outer seating places P1, P2 the seat part 10B may include an outer frame 100 and an inner frame 101 movable relative thereto. In the present case, the inner frame 101 of each of the two outer seating places P1, P2, similar to the inner frame 101 of the vehicle seat 1A of FIG. 1, is pivotally mounted relative to the outer frame 100. The pivot axis S1 extends close to a front edge of the seat part 10B facing away from the backrest 11B.

The outer frame 100 with respect to each of the outer seating places P1, P2 carries an outer supporting element 102, which can also be referred to as a seat pan. The outer supporting element 102 is attached to the outer frame 100. The inner frame with respect to each of the outer seating places P1, P2 carries an inner supporting element 103, which in the present case is each configured in the form of a spring mat. The inner supporting element 103 is attached to the inner frame 101.

The outer supporting element 102 in the present case is of U-shaped design and encloses the inner supporting element 103. The outer supporting element 102 has a surface (facing a seat user) that represents an outer (in the present case U-shaped) part SFa of a seating surface SF of the respective outer seating place P1, P2. The inner supporting element 103 has a surface (facing a seat user) that represents an inner part SFi (in the present case formed by the individual spring plates) of the seating surface SF.

The outer part SFa and the inner part SFi of the seating surface SF associated with a seating place P1, P2 are movable relative to each other by a movement of the inner frame 101 relative to the outer frame 100.

Similar to the seat part 10B, the backrest 11B includes an outer frame 110 and an inner frame 111 for each of the outer seating places P1, P2. The inner frame 111 is movably mounted with respect to (in the present case on) the outer frame 110. In the illustrated example, the inner frame 111 is pivotally mounted relative to the outer frame 110 about a pivot axis S3, which is arranged close to the upper end edge (facing away from the seat part 10B) of the backrest 11B. The pivot axes S1, S3 of the seat part 10B and of the backrest 11B extend parallel to each other. The inner frame 111 extends over a large part of the height of the backrest 11B, in particular over more than half of the height and/or the width, in particular over an area that is larger than a lordosis area. Optionally, an adjustable lordosis support is arrangeable or arranged on the inner frame.

Each of the outer frames 110 of the backrest 11B carries an outer supporting element 112, which in the present case is of U-shaped design and surrounds an inner supporting element 113, which is carried by the inner frame 111. The inner supporting element 113 is configured in the form of a spring mat with spring plates.

The outer and inner supporting elements 102, 112, 103, 113 of the seat part 10B and the backrest 11B are each manufactured from a flat material, in particular from a plastic material, e.g. POM (polyoxymethylene) or a composite material, such as a fiber-reinforced plastic material, e.g. from organic sheet. Organic sheet may include continuous fibers (with a length of typically at least 50 mm) that are embedded in a thermoplastic plastics matrix. From the flat material pieces for the inner supporting elements 103, 113 the spring mats are each formed by slitting.

The middle seating place P3 has no pivotable inner frames associated thereto. For the middle seating place P3, the seat part 10B may include a middle-seat supporting element 104 that is firmly connected to the base 18 of the bench seat 1B. The outer frames 100 of the bench seat 10B are also firmly connected to the base 18. Correspondingly, the backrest 11B for the middle seating place P3 may include a middle-seat supporting element 114 that is firmly connected to the outer frames 110 of the backrest 11B.

Figure 2A:
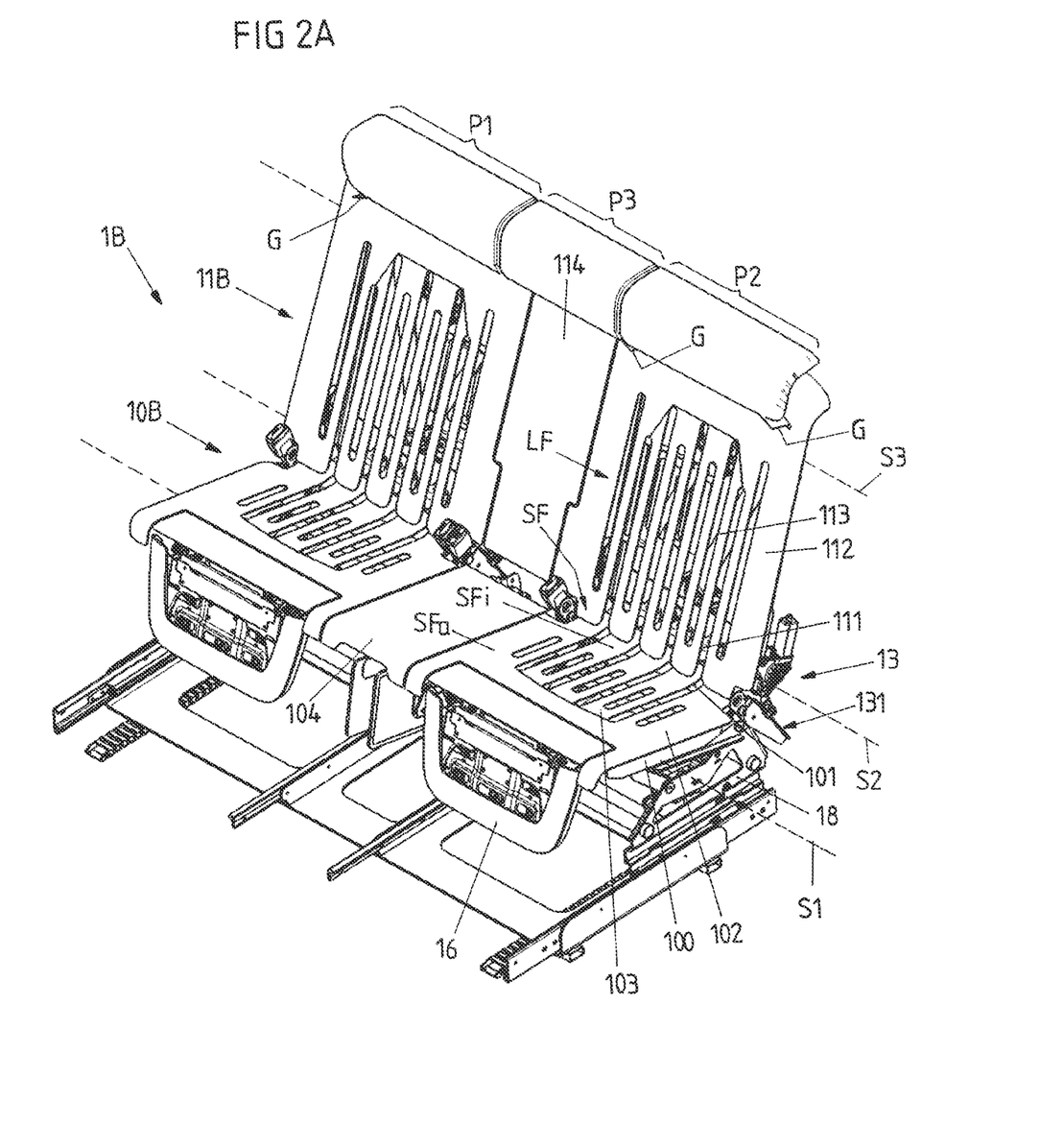
FIGS. 2A and 2B show various settings of a vehicle seat configured as a bench seat comprising a backrest and a seat part with a plurality of seating places and a plurality of outer frames each having an inner frame adjustable relative thereto.
Figure 3A:
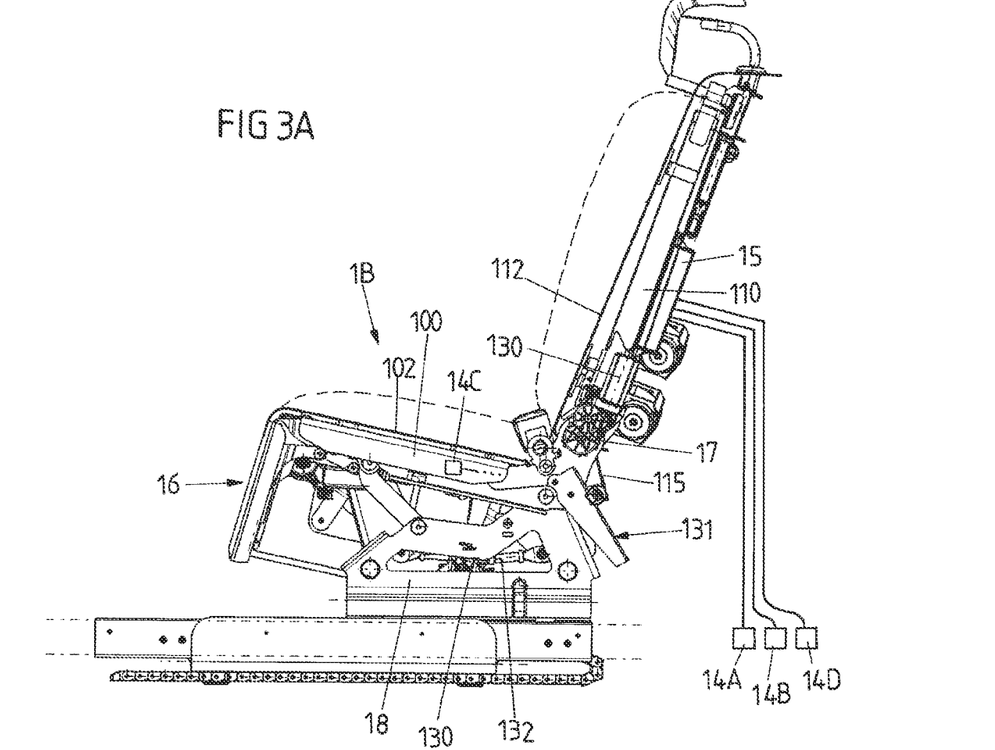
FIGS. 3A and 3B show the vehicle seat of FIGS. 2A and 2B in the settings shown there in a side view.

FIGS. 2A and 3A show the bench seat 1B in a flat setting. The seat part 10B is configured flat. The surface that may include the seating surfaces SF of the seating places P1, P2 and the middle seating place P3 (in the concrete case consists of the same) is substantially flat. The backrest 11B also is shown in a flat setting corresponding to the seat part 10B, in which the surface that may include the backrest surfaces LF is substantially flat. In this setting, the seat part 10B and the backrest 11B here are each continuously flat (across the entire width). In this setting, the three seating places P1-P3 are substantially equivalent. Due to a non-existent contouring, a seat user can sit down slightly offset from the arrangement of the inner frames 100, 110 without a significant loss of comfort. Thus, each of three seat users can occupy one third of the entire width of the bench seat 1B.

In the flat setting, the inner frames 101, 111 in a first position are arranged flush with the outer frames 100, 110.

Figure 2B:
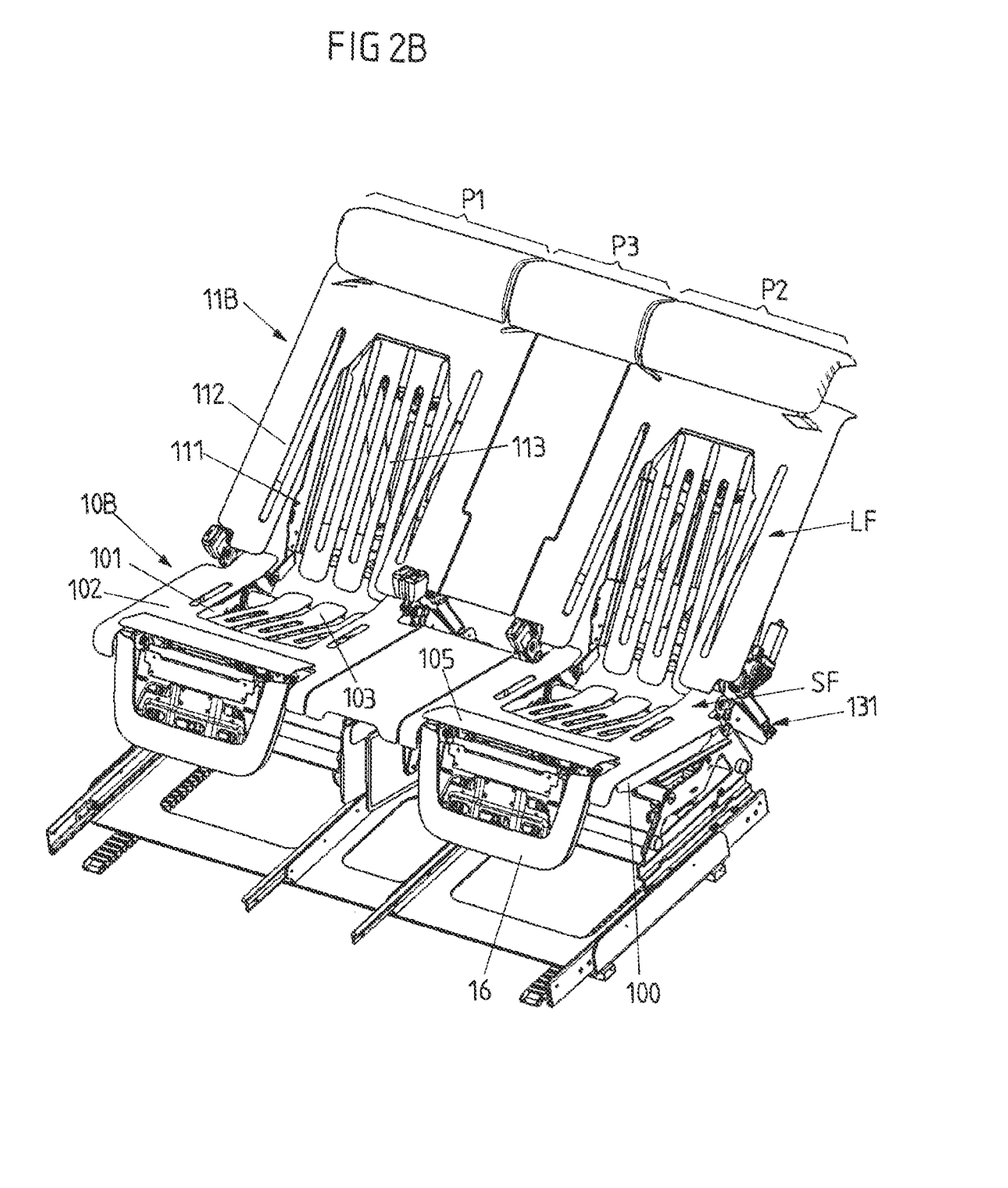

When one of the inner frames 101, 111 of the seat part 10B or of the backrest 11B is lowered relative to the respective outer frame 100, 110 proceeding from the flat setting as shown in FIGS. 2A and 3A, a trough is formed, see in particular FIG. 2B. A seat user can sit or lean into this trough. Due to the troughs in the seat part 10B and in the backrest 11B, a seat user is laterally supported particularly well, e.g. during cornering. The trough on the seat part 10B deepens towards the backrest 11B. The trough on the backrest 11B deepens towards the seat part 10B.

Figure 3B:
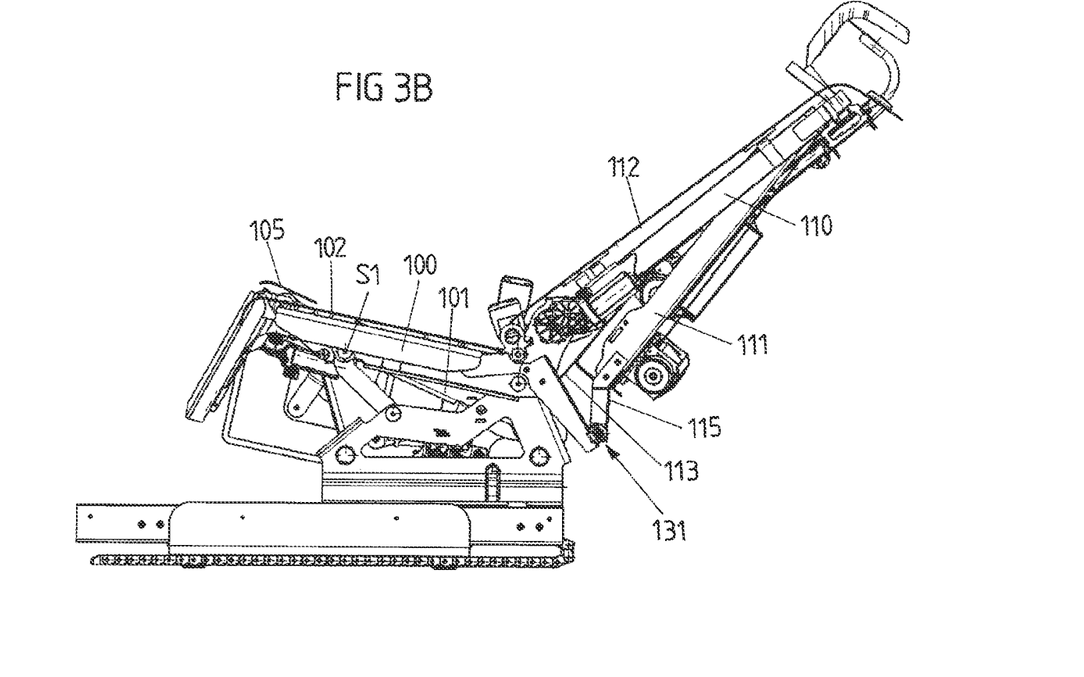
Figure 4A:
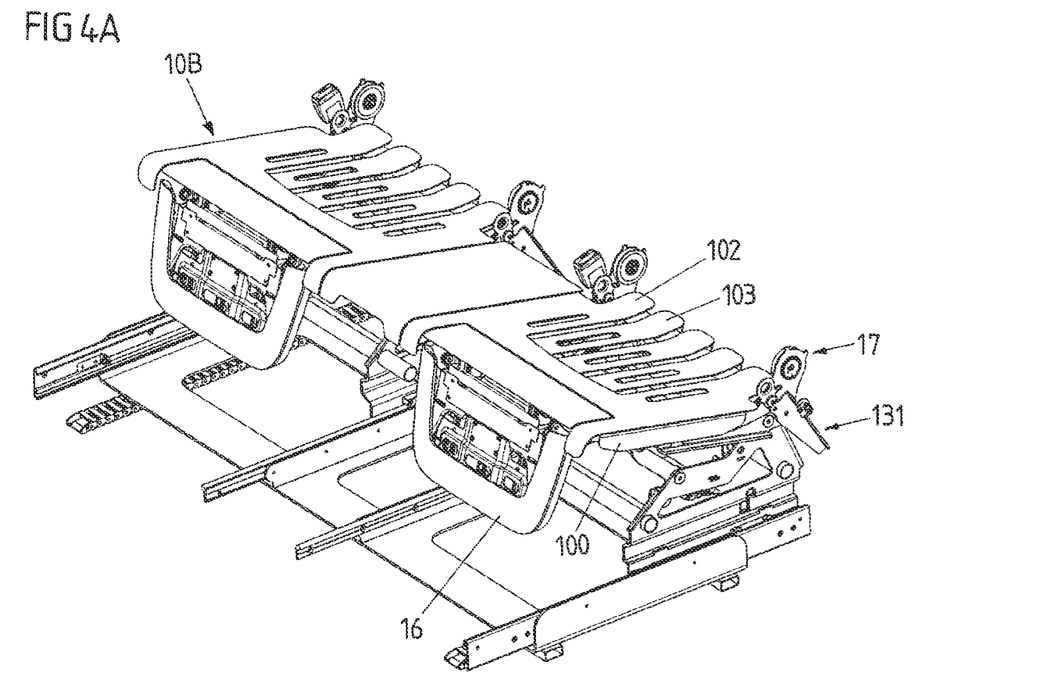
FIGS. 4A, 4B, 5A, and 5B show the seat part of the vehicle seat of FIGS. 2A to 3B in the two different settings in perspective views and side views.
Figure 4B:
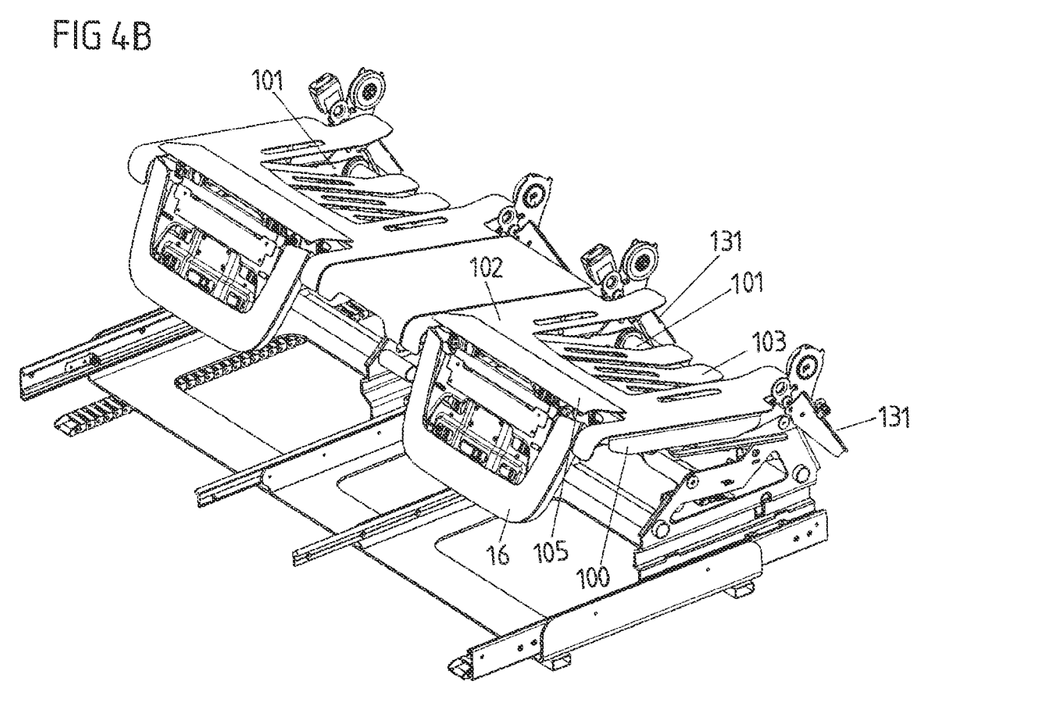
Figure 5A:
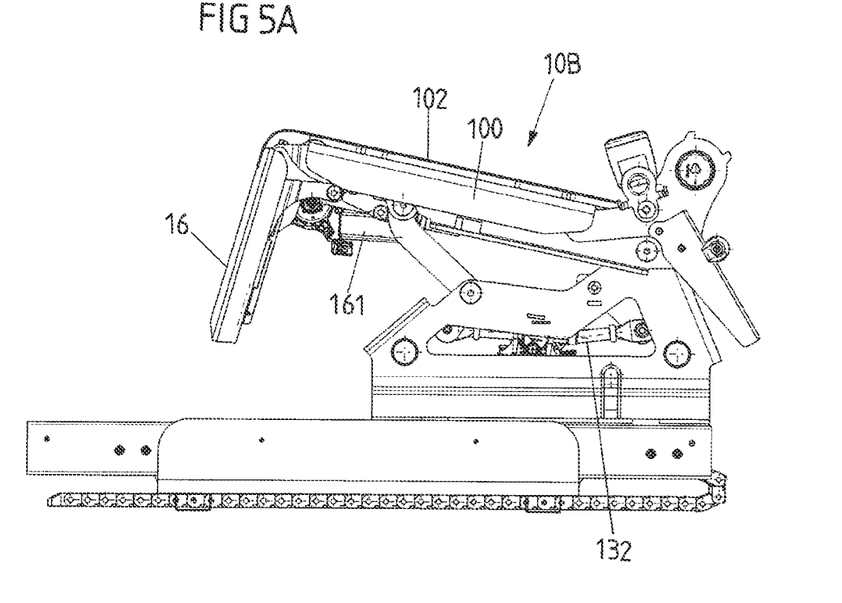
Figure 5B:
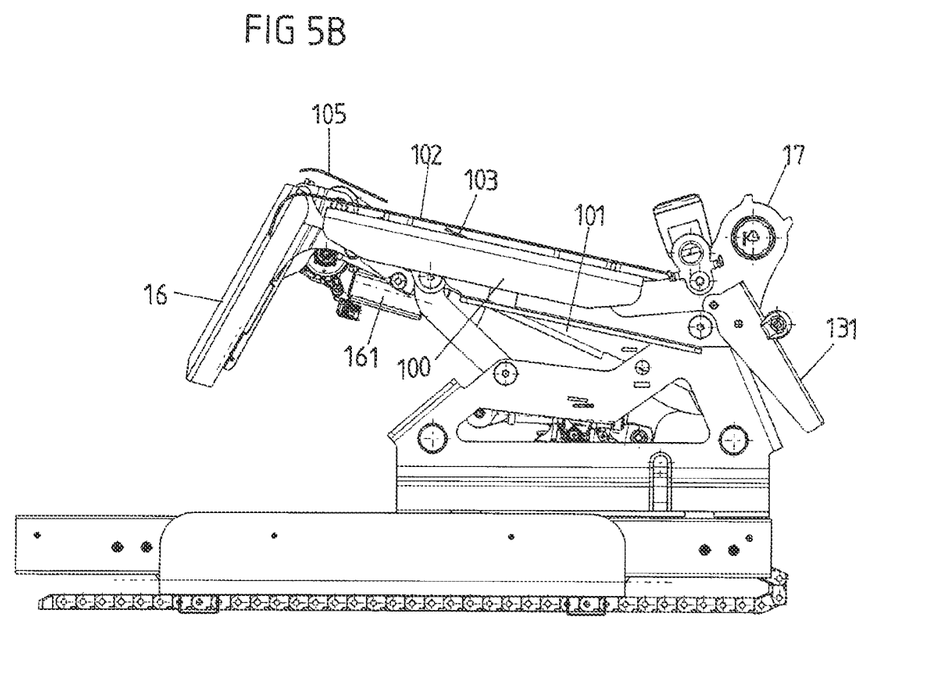

In the present case, the inner frame 101 of the seat part 10B extends on both sides of its pivot axis S1, see in particular FIG. 3B. As a result, not only a part of the inner frame 101 facing the backrest 11B is lowered, but also a (comparatively smaller) part of the inner frame 101 is lifted, which proceeding from the pivot axis S1 extends away from the backrest 11B. A cover 105 attached to the inner frame thereby is lifted with respect to the outer supporting element 102. In the flat setting, the cover terminates flush with the outer supporting element. The cover 105 defines a front end edge of the seat part 10B. Alternatively, the pivot axis S1 can be arranged at the front end of the inner frame 101.

Due to the trough-shaped contouring, a seat user sitting centrally in the trough typically occupies about 40% of the entire width of the bench seat 1B. In this contoured setting, the inner frames 101, 111 are arranged with an inclination relative to the outer frames 100, 110. As compared to this flat setting, the inner parts SFi of the seating surface SF and the backrest surface LF are lowered. The outer parts SFa of the seating surface SF and the backrest surface LF form side bolsters for laterally supporting the seat user.

The flat setting can be chosen when three seat users want to sit down. The contoured setting can be chosen when only one seat user or two seat users want to sit down. Furthermore, it is possible to set an intermediate position with a slight contouring.

Furthermore, it is possible to fold the backrest 11B even further to the rear proceeding from the position shown in FIG. 2B, in order to set a relax or reclined position, e.g. with an angle of more than 120° or more than 140° between the backrest 11B and the seat part 10A.

To transfer the seat part 10B and/or the backrest 11B from the flat setting into the contoured setting, and vice versa, drive motors or a manual adjustment can be provided. In the illustrated example, an adjustment of the inner frames 111 of the backrest 11B relative to the outer frames 110 of the backrest 11B is coupled to the setting of an inclination of the backrest 11B relative to the seat part 10B. When the adjustment fittings 17 are actuated by means of an electric drive 130 (in the form of an electric motor with a transmission) of an adjusting device 13, in order to change the inclination of the backrest 11B relative to the seat part 10B, an extension arm 115 of the inner frame 111 coupled to a guide 131 runs along the guide 131, which in the present case is firmly connected to the base 18. When the backrest 11B (and hence the outer frames 110) swivels backwards, the inner frames 111 swivel downwards. In this way, a particularly small number of motors is necessary. Alternatively, it is also possible to provide an adjustment without motor and e.g. with a forced coupling. For example, the adjustment fittings 17 can be unlocked and locked manually so that the backrest 11B can be swiveled manually after unlocking, wherein the inner frames 101, 111 of the seat part 10B and/or of the backrest 11B are adjusted via the forced coupling.

The movement of the inner frames 101 of the seat part 10B can be mechanically or controllably coupled to the movement of the inner frames 111 of the backrest 11B. In the present case, a further electric drive 130 (in the form of an electric motor with a transmission) is provided, which drives the movement of at least one of the inner frames 101 of the seat part 10B, concretely via a spindle 132 (see in particular FIG. 3A).

To choose between the flat setting and the contoured setting, a control unit 15 can be provided, which is operatively connected to an input means 14A. The input means for example is a switch or a software-based interface, in particular a user interface. For example, a driver can select (e.g. in a menu) what setting is to be set. This selection is provided as a signal to the control unit 15 which then correspondingly actuates the electric drives 130 of the bench seat 1B.

Alternatively or additionally, at least one door contact 14B is provided, which detects whether a vehicle door is open or closed. The control unit can make the setting of the bench seat 1B dependent on a signal from the door contact 14B.

Furthermore, the bench seat 1B may include at least one (optional) seat occupation sensor 14C, wherein the control unit 15 can receive signals from the same.

The control unit 15 furthermore can jointly evaluate the signals of the door contact 14B and of the seat occupation sensor 14C in order to detect whether a passenger exits or enters. In dependence thereon, the control unit 15 can perform a setting of the bench seat 1B, in particular of the inner frames 101, 111.

Further signal sources are conceivable, e.g. pre-crash sensors or wireless data interfaces. When the control unit detects signals from a pre-crash sensor, which indicate an imminent accident, a particularly crash-safe setting can be set. Via the wireless data interface, a central unit for example can inform the control unit 15 that a third passenger will be boarding shortly so that said control unit switches from the contoured setting into the flat setting. Furthermore, the control unit 15 can receive biometric data (of an optionally future) seat user e.g. via a communication interface 14D and correspondingly set the bench seat 1B (e.g. already before entry).

Furthermore, the control unit 15 can be configured to determine the number of seat users with reference to the signals of the seat occupation sensor(s) 14C and/or of the door contact 14B. In dependence on the determined number, the appropriate setting can be chosen, e.g. the contoured setting for one or two seat users and the flat setting for three seat users.

It should be noted that over the seating surfaces SF and backrest surfaces LF cushions and/or covers can be arranged, as is illustrated in FIG. 3A by means of broken lines. These cushions are e.g. continuously flat (at least when the inner frames 101, 111 are positioned in the flat position). The cushions can be coupled to the inner frames 101, 111 (e.g. linked to the spring mats) so that lowering of the inner frames 101, 111 will draw one or more troughs into the cushions.

Furthermore, it should be noted that it is optionally possible to morph only one of the two outer seating places P1, P2, i.e. to configure one of the seating places flat and the other contoured.

Moreover, the bench seat 1B alternatively also might include only one of the outer seating places P1, P2 and the middle seating place P3, which then likewise is an outer seating place not to be morphed, however. In further alternative embodiments, other numbers of seating places are also possible, e.g. four or more. In general, it can be provided that the bench seat 1B includes at least one seating place to be morphed (on which an inner frame is provided, which is adjustable with respect to the outer frame as described) and at least one seating place not to be morphed (which in particular includes a chiefly or completely rigid seating surface or backrest surface).

One or more, in the present example all of the outer frames 100, 110 are made of steel, for example. One or more (here all) of the inner frames 101, 111 can be made of a plastic material, which provides for a low weight.

In particular FIGS. 4A to 5B furthermore show leg rests 16 of the bench seat 1B. In the present case, a leg rest 16 is provided for each of the outer seating places P1, P2 and therefor mounted on the respective inner frame 101 of the seat part 10B, namely pivotally in the illustrated example. To effect a swivel movement, one electric drive 161 (in the form of an electric motor with a transmission) each is provided, which pivots the leg rest 16 relative to the inner frame 101. When the electric drive 161 is not activated, the leg rest 16 follows the movement of the inner frame 101 relative to the outer frame 100.

The control unit 15 can actuate the electric drive 161 of the leg rest 16 such that the leg rest 16 is adjusted relative to the inner frame 101 when the inner frame 101 is adjusted relative to the outer frame 100. Alternatively or additionally, the control unit 15 can actuate the electric drive 161 of the leg rest in dependence on an external signal, e.g. of the input means 14A, of the door contact 14B, of the seat occupation sensor 14C and/or of the communication interface 14D.

Figure 6:
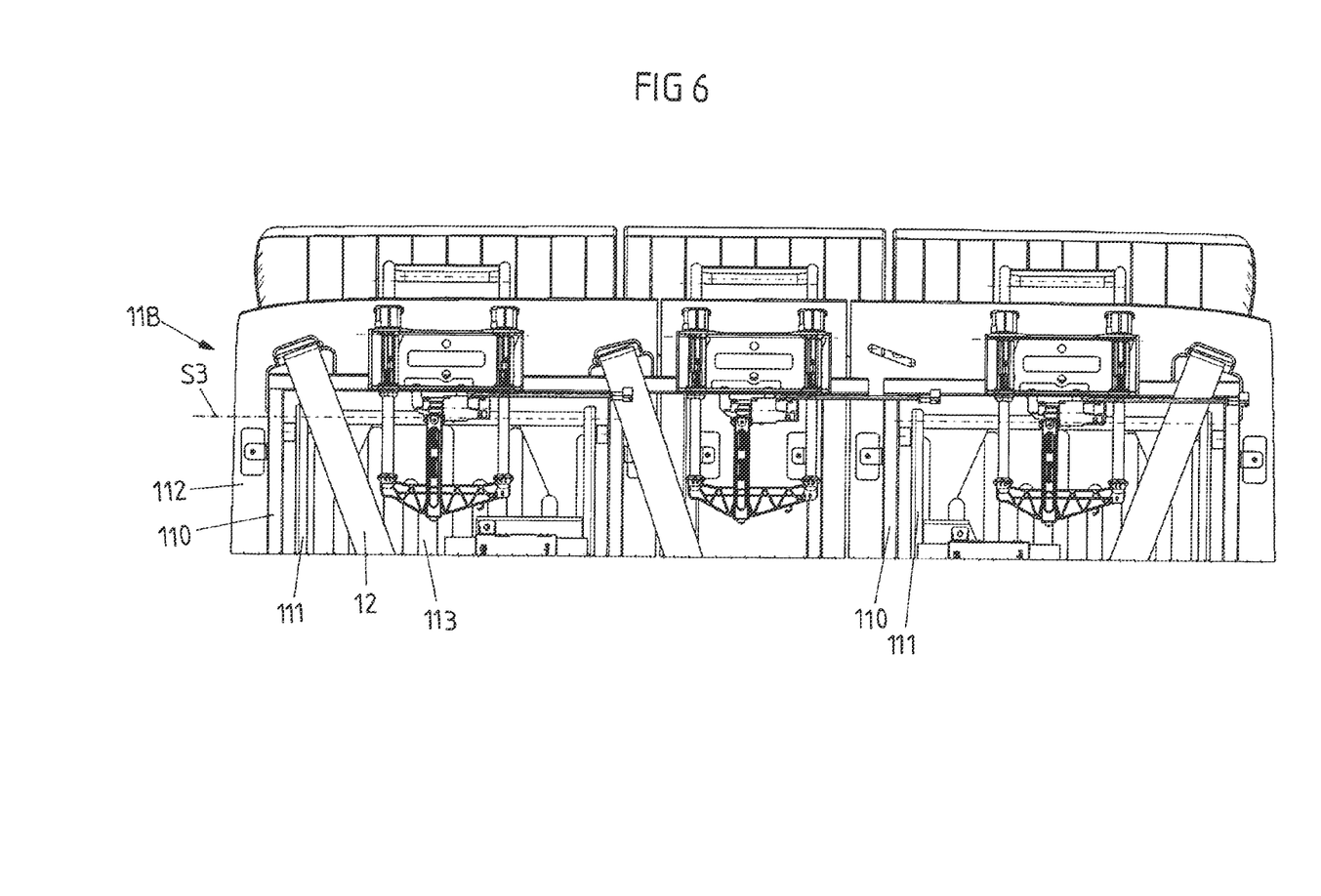
FIG. 6 shows the backrest of the vehicle seat of FIGS. 2A to 3B in a top view of the back side.

FIG. 6 shows the back side of the backrest 11B and in particular illustrates the pivotable mounting of the inner frames 111 on the respective outer frame 110, as already described. Furthermore, the three seat belts 12 can be seen.

Figure 7:
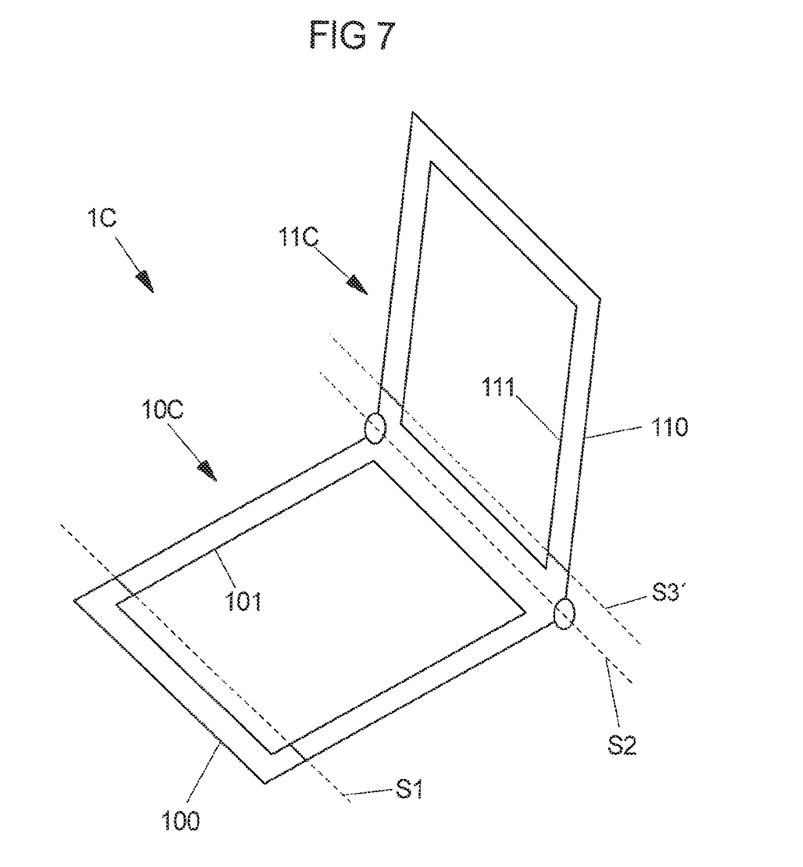
FIG. 7 shows a vehicle seat comprising a backrest and a seat part, which each include an outer frame and an inner frame adjustable relative thereto.

FIG. 7 shows another vehicle seat 1C whose seat part 10C is configured similar to the seat part of the vehicle seat 1A of FIG. 1, and which includes a backrest 11C that may include an outer frame 110 and an inner frame 111 pivotable thereto. The inner frame 111 is pivotable about a pivot axis S3' that is arranged in the region of the lower end of the backrest 11C. This causes an upper end of the inner frame 111 to swivel with the widest deflection. In this way, it is possible to achieve so-called cocooning, i.e. to shield a passenger sitting on the vehicle seat 1C from the surroundings. Optionally, e.g. loudspeakers are provided. The possibility of cocooning is particularly interesting e.g. in self-propelled taxis or buses.

Figure 8:
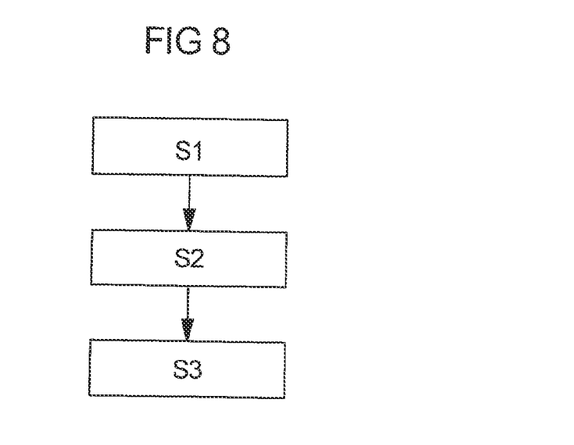
FIG. 8 shows a method of setting the vehicle seat.

FIG. 8 shows a method of setting a vehicle seat, in particular the vehicle seat 1B of FIGS. 2A to 6. The method may include the following steps:

Step S1: Detecting, by means of a control unit 15, at least one signal, in particular from an input means 14A, a door contact 14B, a seat occupation sensor 14C and/or a communication interface 14D or another signal source.

Step S2: Determining, by means of the control unit 15, the number of seat users in dependence on the at least one signal.

Step S3: Setting, by means of the control unit 15, a contour of a seating surface and/or a backrest surface of the vehicle seat 1A-1C by adjusting the at least one inner frame 101, 111 relative to the at least one outer frame 100, 110 of the vehicle seat 1A-1C in dependence on the detected signal, in particular in dependence on the determined number of seat users.

Figure 9:
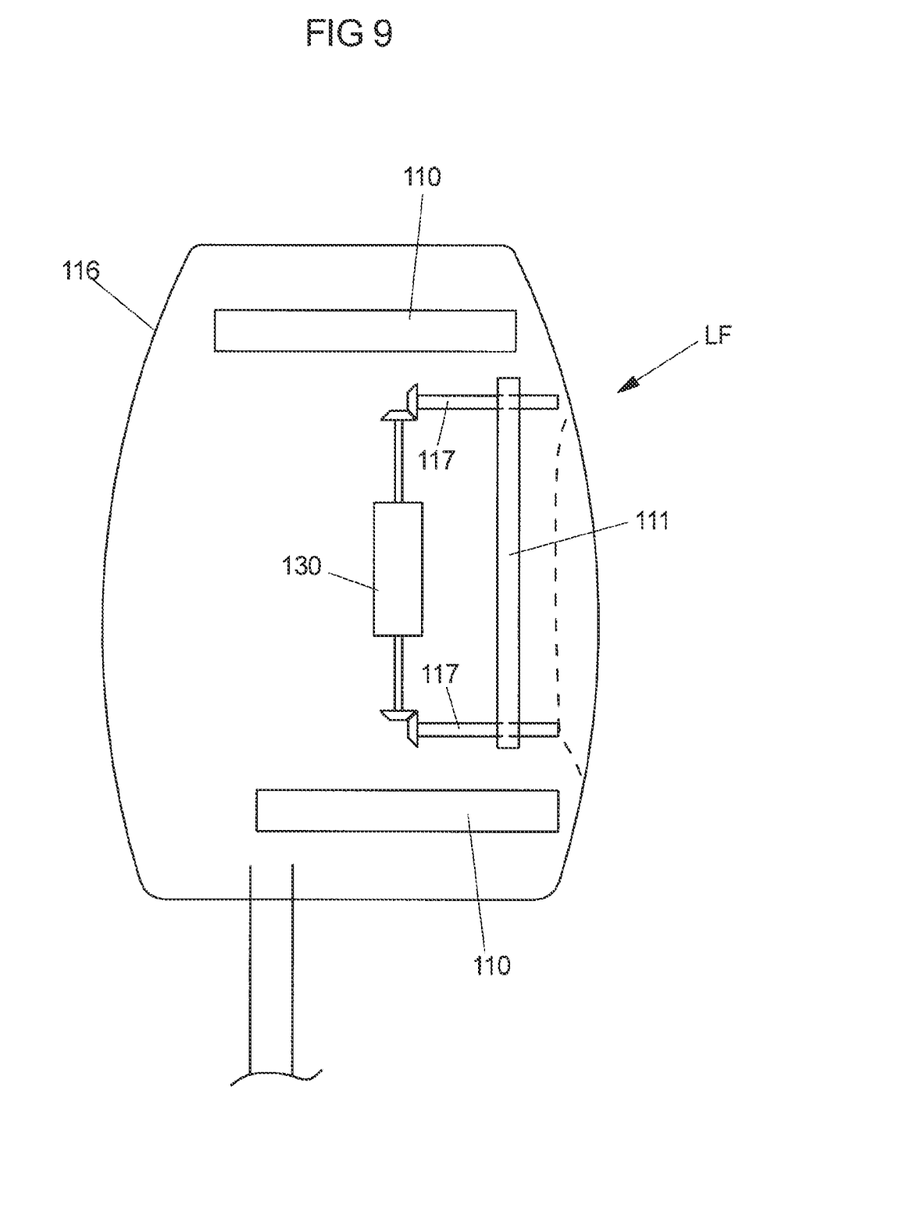
FIG. 9 shows a headrest of the vehicle seat of FIGS. 2A to 6.

FIG. 9 shows a headrest 116 of the vehicle seat 1B of FIGS. 2A-6. The headrest 116 as part of the backrest 11B may include an outer frame 110 on which an outer part of the backrest surface LF is supported and an inner frame 111 on which an inner part of the backrest surface LF is supported and which is movable relative to the outer frame 110, wherein the inner frame 111 is movable into a first position relative to the outer frame 110, in which the outer and the inner part of the backrest surface LF are non-contoured and arranged substantially flat, and into a second position relative to the outer frame 110, in which the outer and the inner part of the backrest surface LF are arranged in the form of a trough. FIG. 9 shows a slightly trough-shaped second position. The inner frame 111 and the outer frame 110 support a cushion that forms the backrest surface LF of the headrest 116.

For adjusting the inner frame 111, the headrest may include an electric drive 130 that is coupled to at least one, here two spindles 117 that in turn is/are coupled to the inner frame 111. The electric drive 130 is configured such that it can move the inner frame 111 relative to the outer frame by a rotation of the spindles 117. The outer frame 110 includes a plurality of side parts spaced apart from each other, which are firmly connected to each other. In the present case, the inner frame 111 constitutes an oblong plate, but alternatively can also include a plurality of side parts spaced apart from each other, which are firmly connected to each other.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1A-1C vehicle seat (bench seat)
10A-10C seat part
100 outer frame
101 inner frame
102 outer supporting element
103 inner supporting element
104 middle-seat supporting element
105 cover
11A-11C backrest
110 outer frame
111 inner frame
112 outer supporting element
113 inner supporting element
114 middle-seat supporting element
115 extension arm
116 headrest
117 spindle
12 seat belt
13 adjusting device
130 electric drive
131 guide
132 spindle
14A input means
14B door contact
14C seat occupation sensor
14D communication interface
15 control unit
16 leg rest
61 electric drive
17 adjustment fitting
18 base
G belt exit point
LF backrest surface
P1-P3 seating place
S1-S3, S3' pivot axis
SF seating surface
SFa, SFi outer, inner part of the seating surface While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle seat comprising:
a first outer frame configured to support an outer part of a seating surface;
a first inner frame configured to support an inner part of the seating surface and configured to move relative to the first outer frame;
a backrest operatively coupled to at least one of the first outer frame and the first inner frame; and
a control unit configured to command an adjustment of the first inner frame relative to the first outer frame, wherein the movement of the first inner frame relative to the first outer frame moves the backrest relative to a seat part.

2. The vehicle seat of claim 1, wherein a contour of the seating surface is configured to be varied by the first inner frame moving relative to the first outer frame.

3. A vehicle seat, comprising:
a first outer frame configured to support an outer part of a seating surface or an outer part of a backrest surface; and
a first inner frame configured to support an inner part of the seating surface or an inner part of the backrest surface, wherein the first inner frame is configured to move relative to the first outer frame,
wherein the first inner frame is configured to move to a first position relative to the first outer frame, in which the inner part and the outer part of the seating surface or the inner part and the outer part of the backrest surface are non-contoured, and to a second position relative to the first outer frame, in which the inner part and the outer part of the seating surface and the inner part and the outer part of the backrest surface are arranged to form a trough; and
a control unit configured to command an adjustment of the first inner frame relative to the first outer frame, wherein the movement of the first inner frame relative to the first outer frame moves at least one of the inner part of the backrest surface and the outer part of the backrest surface.

4. The vehicle seat of claim 3, wherein the first inner frame and the first outer frame each include two side parts, wherein when the first inner frame and the first outer frame are in the first position, the two side parts of the first inner frame and the two side parts of the first outer frame are arranged parallel to each other.

5. The vehicle seat of claim 3, wherein the first inner frame is pivotable relative to the first outer frame about a pivot axis.

6. The vehicle seat of claim 3, wherein the first inner frame carries an inner supporting element, wherein the inner supporting element forms the inner part of the seating surface or the backrest surface, and the first outer frame carries an outer supporting element forming the outer part of the seating surface or the backrest surface.

7. The vehicle seat of claim 6, wherein the inner supporting element is formed by an elastic spring mat.

8. The vehicle seat of claim 3,
wherein the backrest is provided with a second outer frame, configured to support an outer part of a backrest surface of a seating place, and a second inner frame configured to support an inner part of the backrest surface of a seating place and configured to move relative to the second outer frame,
and wherein the first inner frame and the first outer frame are parts of a seat part and support the seating surface of the seating place-.

9. The vehicle seat of claim 8, wherein an adjustment of the first inner frame of the seat part-relative to the first outer frame of the seat part causes the second inner frame of the backrest to adjust relative to the second outer frame of the backrest.

10. The vehicle seat of claim 3, wherein the vehicle seat includes a first seating place and a second seating place each include at least one of the first outer frame or a second outer frame and at least one of the first inner frame or a second inner frame, wherein the second inner frame is adjustable relative to the second outer frame.

11. The vehicle seat of claim 10, wherein the vehicle seat includes a third seating place disposed between the first seating place and the second seating place.

12. The vehicle seat of claim 3, further comprising:
at least one electric drive configured to adjust the first inner frame relative to the first outer frame.

13. The vehicle seat of claim 12, wherein the electric drive is configured to be activated based on actuation of an input means, a door contact, a seat occupation sensor and/or a communication interface.

14. The vehicle seat of claim 3, further comprising:
a leg rest is mounted on the first inner frame.

15. The vehicle seat of claim 14, further comprising:
an electric drive, wherein the leg rest is pivotally mounted on the first inner frame and the electric drive is configured to pivot the leg rest relative to the first inner frame.

16. The vehicle seat of claim 3, further comprising:
a headrest of the vehicle seat, wherein the headrest is arranged on a second outer frame and a second inner frame.

17. The vehicle seat of claim 16, wherein a backrest includes the second outer frame and the second inner frame, and the second inner frame and the second outer frame are disposed below the headrest, wherein the second inner frame is adjustable relative to the second outer frame.

18. A method of setting a position at least one vehicle seat, the method comprising:
detecting at least one signal from an input means, a door contact, a seat occupation sensor, and/or a communication interface;
setting a contour of a seating surface and/or a backrest surface of a backrest of the vehicle seat by adjusting at least one of a first inner frame or a second inner frame relative to at least one of a first outer frame or a second outer frame of the vehicle seat based on the detected signal;
commanding an adjustment of the first inner frame relative to the first outer frame; and
adjusting a position of the backrest via movement of the first inner frame relative to the first outer frame.

19. The method of claim 18, further comprising:
determining a number of seat users based on the at least one signal, wherein a setting step is further based on the determined number of seat users.

20. The method of claim 19, wherein the setting step includes setting the at least one of the first inner frame or the second inner frame to a first position relative to the at least one of the first outer frame or the second outer frame, in which the at least one of the first inner frame or the second inner frame and the at least one of the first outer frame or the second outer frame form a flat seating surface or a flat backrest surface in response to the determined number of seat users being equal to or greater than a predetermined number, and wherein the setting step further includes setting the at least one of the first inner frame or the second inner frame to a second position relative to the at least one of the first outer frame or the second outer frame to form a trough-shaped seating surface or a backrest surface in response to the determined number of seat users being less than the predetermined number.

21. The method of claim 18, wherein a setting step includes adjusting two inner frames of a seat part of the vehicle seat, wherein the vehicle seat is a bench seat, and each of the two inner frames are adjusted relative to two outer frames and/or two inner frames of a backrest of the vehicle seat are adjusted relative to two outer frames of the backrest.

22. The method of claim 18, wherein a setting step includes adjusting the first inner frame of a seat part relative to the first outer frame of the seat part conjointly with the second inner frame of a backrest adjusting relative to the second outer frame of the backrest.

\* \* \* \* \*